PHASE DETECTOR

Original Filed Oct. 19, 1965

INVENTOR
EDWARD H. BOHLKE
DON A. KRAMER
BY Mueller, Aichele & Rauner
ATTYS

United States Patent Office 3,487,168

Patented Dec. 30, 1969

3,487,168

PHASE DETECTOR

Edward H. Bohlke, Elmwood Park, and Don A. Kramer, Rolling Meadows, Ill., assignors to Motorola, Inc., Franklin Park, Ill., a corporation of Illinois Continuation of application Ser. No. 497,793, Oct. 19, 1965. This application Nov. 6, 1968, Ser. No. 774,602

Int. Cl. H04l *7/00;* H04n *5/00*

U.S. Cl. 178—69.5 7 Claims

ABSTRACT OF THE DISCLOSURE

A phase detector includes a Zener diode with sawtooth signals applied thereto along with opposite phase pulse signals which drive the Zener diode between forward conduction and reverse or Zener conduction. An output resistor-capacitor circuit coupled to the Zener diode provides a direct current voltage variable with phase difference between the sawtooth signals and pulse signals.

Figure 1:
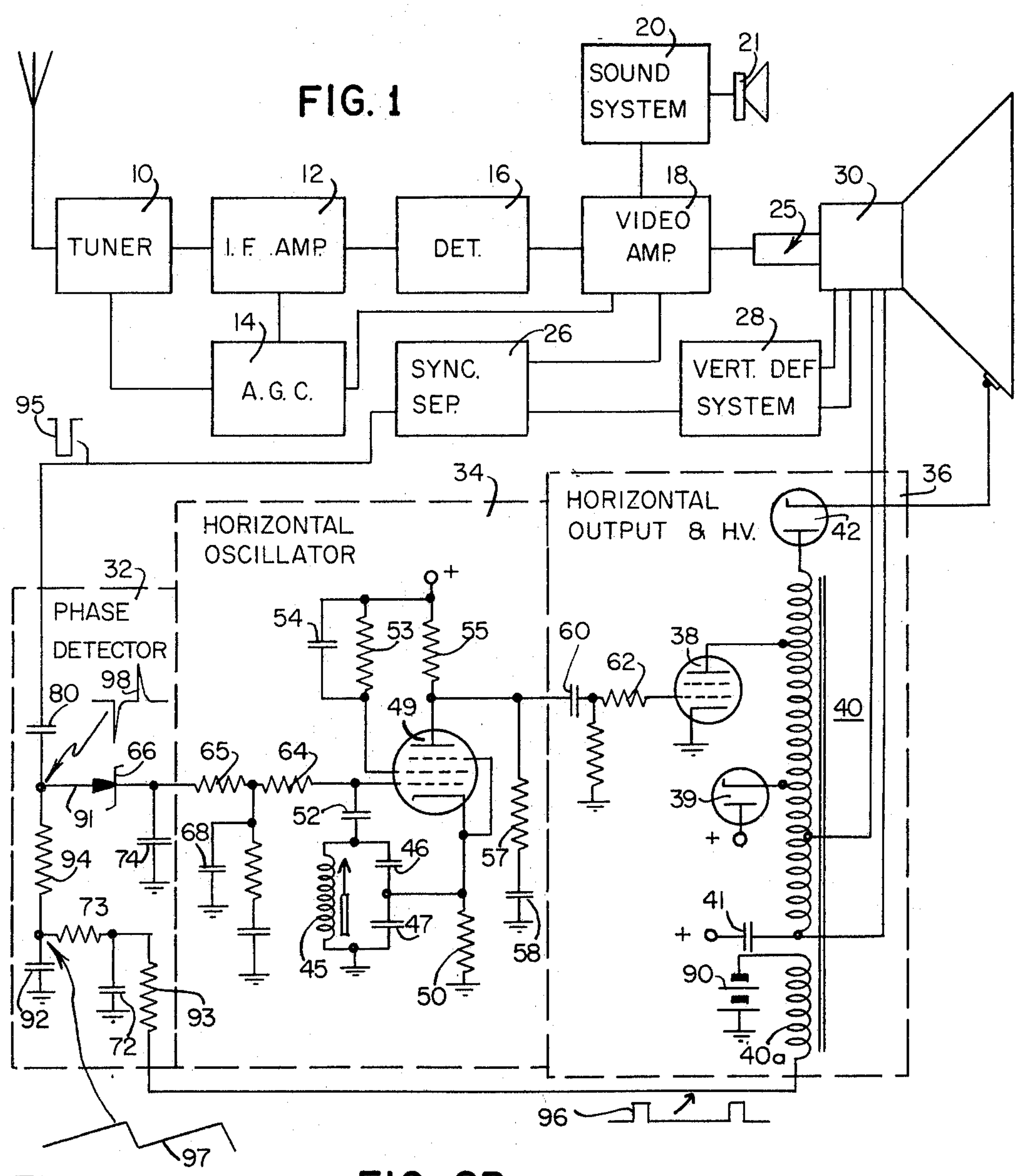

This is a streamlined continuation of application Ser. No. 497,793, filed Oct. 19, 1965, now abandoned.

To establish the frequency of the deflection wave in a television receiver it is necessary to compare the phase of the synchronizing signals and the deflection signals, usually in a phase detector. The known circuitries for phase detectors need at least two diodes and were often difficult to adjust for balanced operation. Furthermore, if an excellent isolation between horizontal and vertical synchronizing signals is desired, a complicated circuitry with many parts is required.

An object of this invention is to simplify and reduce the number of parts in a phase detector particularly suitable for a television receiver.

A further object is to provide a simple phase detector which has desirably balanced operation and which produces improved isolation between horizontal and vertical synchronizing systems in a television receiver.

Figure 2A:
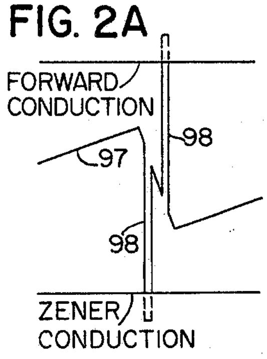
Figure 2B:
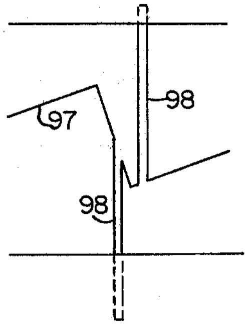

The invention is illustrated in the drawings in which:

FIG. 1 shows a diagram of a television receiver, partly in block and partly in schematic representation, which incorporates the invention; and FIGS. 2A and 2B show the superposition of the differentiated horizontal synchronizing pulse on a sawtooth voltage at balanced and unbalanced operation conditions of the circuit of FIG. 1.

In a specific form the invention is particularly useful in the horizontal deflection system of a television receiver which includes a horizontal oscillator, with free running capability, having a control electrode in an oscillator valve, the potential of which may be varied to adjust the oscillator frequency and thus the beam scanning rate. A phase detector is connected to be responsive to the separated sync pulses of a received signal as well as the actual sweep pulses developed for use in the receiver. When a timing error between these pulses exists, the phase detector provides a control potential to regulate the bias of the oscillator in a direction to tend to bring the sweep system into synchronism with the received synchronizing pulses. This phase detector includes an integrating circuit for the horizontal sweep pulses and bias means. Further, a differentiating circuit is coupled to the synchronizing signal separator to form opposite polarity pulses of non-varying amplitude from the leading and trailing edges of the sync pulses of the received video signal. The integrating circiut and the differentiating circuit form a superposition circuit which is connected through a Zener diode to the bias circuit to the cotnrol electrode of the oscillator valve. The biased Zener diode is a voltage controlled switch device with a non-conductive voltage range and conductive ranges on either side of the non-conductive range. Accordingly, with a time difference between the horizonal synchronizing pulses of the received signal and the deflection signals the Zener diode is forward or reverse conductive corresponding to the direction of the time shifting and, thus, produces an average diode current which is greater in one direction or the other resulting in higher or lower average direct current potential across a further capacitor connected to the Zener diode at the junction with the bias circuit of the control electrode. Thus, the oscillator can be controlled by a phase detector over a large range and also the oscillator will not be cutoff by spurious signal energy because of the isolation between the horizontal and vertical synchronizing systems.

FIGURE 1 shows a representative circuitry for a television receiver in which the invention is incorporated. The tuner 10, which may include an RF amplifier and a suitable mixer and oscillator, provides a signal of fixed frequency for the intermediate frequency amplifier 12. Both tuner 10 and IF amplifier 12 are controlled by a gain control potential from the AGC stage 14 in accordance with usual practice. The selected and amplified signal is applied to the detector 16 which is connected to the video amplifier stage 18. The FM sound subcarrier of the demodulated signal is applied to a sound system 20 wherein the audio signal is derived and amplified in order to drive loudspeaker 21.

The video amplifier 18 also supplies a signal level dependent control to the AGC system 14 and the video portion of the signal to the cathode ray tube 25. The video amplifier 18 is further connected to the synchronizing signal separator 26 which amplitude separates the vertical and horizontal synchronizing componetns of the composite television signal after it is demodulated by the detector 16. The vertical synchronizing components at 60 cycles per second are applied to the vertical deflection system 28 which produces a suitable driving current for the deflection yoke 30 on the neck of the cathode ray tube 25.

The synchronizing signal separator 26 is also connected to the phase detector 32 which, as will be explained subsequently in detail, produces a direct current control voltage to properly synchronize the horizontal deflection system with respect to the received signal. The output of the phase detector 32 is applied to the horizontal oscillator 34 to provide a properly synchronized drive for the horizontal output stage 36.

In accordance with usual practice, the stage 36 includes a horizontal output tube 38 connected to the horizontal output transformer 40. The horizontal deflection windings of the yoke 30 are connected to the primary winding of the transformer 40 and the system with the damper diode 39 and bootstrap capacitor 41, is operative in known manner to produce a substantially sawtooth current wave through the yoke 30 for proper beam deflection. Transformer 40 also includes a winding portion which is connected to the high voltage rectifier 42 in order to rectify the high voltage pulses produced in the transformer 40 to provide a direct current potential of the order of 20 kv. or more for the screen of the cathode ray tube 25.

Considering now the horizontal oscillator 34, the circuitry of said stage may be described as a modified Colpitts sine wave oscillator. This stage can be constructed to provide efficiency and simplicity while at the same time producing a sufficient drive voltage for the tube 38 to effect wide angle deflection in the picture tube 25.

Variable inductor 45 is connected in parallel with a series combination of the capacitors 46 and 47. The elements 45, 46, 47 form a resonant circuit which determines the free running frequency of the oscillator 34.

Adjustment of inductor 45 forms a horizontal "hold" control and is thus the manual adjustment for setting of the oscillator frequency (15.75 kc.) with respect to the received signal and the condition of the receiver. The Colpitts oscillator circuit is evidenced by the connection of the cathode of the horizontal oscillator tube 49 to the junction of the tuning capacitor 46, 47. Thus, regenerative feedback is obtained in the cathode circuit across the cathode resistor 50 which is connected between the cathode and ground. Cathode bias is also developed across resistor 50. The top of the tuned circuit 45, 46, 47 is connected through capacitor 52 to the control grid of oscillator tube 49.

The screen grid of oscillator tube 49 is connected through a resistor 53 to the B+ supply and is bypassed by a condenser 54. The screen grid forms the output electrode of the sine wave oscillator and is electron coupled to the anode of the tube 49, which is connected through the load resistor 55 to the B+ potential.

The oscillator tube 49 is conductive to the positive peaks of the grid waveform, due to the tuned circuit 45, 46, 47 resulting in voltage pulses at the screen grid. The voltage pulses thus coupled to the anode circuit of tube 49 are wave shaped by the series RC network 57, 58 which is connected from the anode to ground. The signal is then fed through the coupling capacitor 60 of the horizontal output stage 36 and the resistor 62 of the control grid of the horizontal output tube 38. The waveform at the control grid of tube 38 is of the usual sawtooth shape with sharp negative cutoff pulses occurring at the time of retrace of the beam.

It has been found that the horizontal output tube 49 can provide sufficient drive foar the horizontal output tube 38 although it is necessary to supply a relatively large control voltage to the oscillator tube 49 in order to properly synchronize oscillator frequency with the received signal. The synchronization can be controlled at the control grid of tube 49 without the utilization of a reactance tube.

During the time of the positive tip of the sine wave at control grid of tube 49, this grid will conduct and charge capacitor 52. The time constant is such that the capacitor 52 will discharge during each cycle of the 15.75 kc. operation of the oscillator.

The charging and discharging of capacitor 52 superimposes a sawtooth voltage on the control grid of the oscillator tube 49. Accordingly, the signal at this grid is a combination sawtooth and sine wave with the sawtooth wave steepening the leading slope of the sine wave in proportion to the amplitude of the sawtooth waveform. The greater the amplitude of the sawtooth, the faster the sine wave will rise to cause grid conduction and the sooner grid conduction will occur during any cycle and the greater will be the frequency of the oscillation.

Proper frequency of phase control of the oscillator 34 can be understood by considering that the application of a lower voltage through resistors 64 and 65 of the control grid of tube 49 will decrease the amplitude of the sawtooth signal since there will be a reduced voltage difference across resistors 64 and 65 as the capacitors 52 and 68 begin to discharge during each cycle. Accordingly, the amplitude of the sawtooth waveform produced by capacitors 52 and 68 and resistors 64 and 65 will decrease and reduce the slope of the leading portion of the sine wave so that the oscillator tube 49 will conduct later in time, thereby lowering the frequency of oscillation.

On the contrary, when a higher potential is applied, a larger voltage difference will be produced across resistors 64 and 65 as capacitors 52 and 68 begin to discharge thereby forming a sawtooth waveform of greater amplitude which makes the leading edge of the positive portion of the sine wave steeper in slope and allows the tube 49 to conduct sooner to increase the frequency of oscillation.

A description will now be given of the phase detector stage 32 and its operation in order to explain how a higher or lower voltage potential is produced in order to increase or decrease the oscillator frequency so that the oscillator 34 is properly synchronized with the horizontal synchronization pulses of the composite video signal.

The phase detector stage 32 comprises an integrating circuit of the series connected resistors 73 and 93 which are connected through winding **40*a* to the horizontal output transformer 40 and a direct current voltage supply 90 to the ground potential. Capacitors 72 and 92 are connected to the resistors 73 and 93 forming the integrating network. The phase detector stage 32 further comprises a differentiating circuit which couples the horizontal synchronizing pulses 95 of the received signal from the synchronizing signal separator 26 to the phase detector stage, which signal separator provides the negative going pulses 95 in response to the horizontal synchronizing pulses of the received signal. The differentiating circuit consists essentially of a series capacitor 80 and shunt resistor 94**.

A Zener diode 66 is connected through a lead 91 to the junction of capacitor 80 and resistor 94 which Zener diode 66 is connected to resistor 65 of the bias circuit of the control electrode of the oscillator. The Zener diode is back biased by the direct current voltage supply 90 to an amount equal to one-half of the Zener conduction value. A further capacitor 74 is connected to the Zener diode at the junction with resistor 65 of the bias circuit of the control electrode.

Positive pulses 96 occurring during the retrace interval are developed in the windings **40*a* and are utilized in the phase detector stage 32 in order to compare the timing of these pulses with the received horizontal sync pulses. The retrace pulse 96 from transformer 40 is developed in windings 40*a* and is reshaped by capacitors 72 and 92 together with resistors 73 and 93 producing a sawtooth voltage wave 97. This sawtooth voltage is superimposed on the differentiated horizontal synchronizing pulse 98 of the received signal. The differentiation function is performed by capacitor 80 together with resistor 94** and parts of the integrating network.

The superimposed signal as it appears on lead 91 or at the Zener diode 66 is illustrated in FIGS. 2A or 2B. FIG. 2A shows the superposition of differentiated horizontal synchronizing pulses 98 on sawtooth voltage wave 97 derived from the retrace pulses 96 in balanced operation conditions, i.e., there is the proper phase relation between both the signals. With these conditions the back biased Zener diode conducts when the peaks of the differentiated horizontal synchronizing pulses 98 which have a peak-to-peak value in excess of the Zener value, overcome the forward and Zener conduction level, causing as much current flowing in one and the other direction so that the average direct current potential is unchanged across capacitor 74. Thus, the amplitude of the sawtooth waveform produced by capacitors 52 and 68 and resistors 64 and 65 is also unchanged, thereby holding the frequency of the oscillator 34.

But when, on the contrary, there is a time difference between the synchronizing pulse and the retrace pulse, the operation conductions are unbalanced causing a greater average diode current in one of the both directions, as it is shown in FIG. 2B. Thereby, the average direct current potential across capacitor 52 is reduced, because the capacitor 74 will assume a lower than usual charge through the conduction of Zener diode 66, and the frequency of oscillation decreases.

When the sawtooth voltage derived from the retrace pulse is properly phased, it should have a peak-to-peak amplitude slightly less than one-half of the Zener value of the diode.

Accordingly, the described system will provide desirable means for isolating the sine wave horizontal oscillator from its controlling phase detector circuit due to the differentiating network for the synchronizing signal. In addition the system will provide a phase detecting circuit capable of improved balanced operation with relatively few parts.

We claim:

1. A phase detector, including in combination, first circuit means providing sawtooth signals in response to first signals for said phase detector, a diode device having two terminals and having a forward conduction voltage level and a reverse conduction voltage level, means coupling said first circuit means to one terminal of said diode device so that the sawtooth signals are between the forward and reverse conduction levels of said diode device, second circuit means coupled to said one terminal of said diode device and providing pulses of opposite polarity in response to second signals for said phase detector, said pulses of opposite polarity together with the sawtooth signals extending respectively beyond the forward conduction level and the reverse conduction level of said diode device, and an output circuit coupled to the other terminal of said diode device for providing a voltage variable with phase variation between said first and second signals.

2. The phase detector according to claim 1 wherein the diode device includes a Zener diode having a forward conduction voltage level and a Zener conduction voltage level, and wherein the first circuit coupling means includes a bias supply so that the sawtooth signals are between the forward and Zener conduction levels of said Zener diode.

3. In a television receiver including a synchronizing signal separator developing horizontal synchronizing signals and a deflection system for scanning a cathode ray beam, said deflection system including an oscillator responsive to a variable control voltage for regulating the frequency of scanning signals in said deflection sytsem; a phase detector, including in combination, first circuit means providing sawtooth signals in response to the scanning signals, second circuit means providing pulse signals of opposite polarity in response to the horizontal synchronizing signals, means including a diode device having a forward conduction voltage level and a reverse conduction voltage level, a coupling circuit connected between one terminal of said diode device and the deflection system, said first and second circuit means coupled to the other terminal of said diode device, whereby the pulse signals and the sawtooth signals provide forward and reverse conduction of said diode device and a relative change in such forward and reverse conduction provides the variable control voltage through said coupling circuit for controlling the oscillator.

4. The combination according to claim 3 wherein the diode device is a Zener diode having a forward conduction voltage level and a Zener conduction voltage level.

5. The combination of claim 3 in which said second circuit means is a differentiating network to develop the pulse signals of opposite polarity in response to leading and trailing edges respectively of the horizontal synchronizing signals.

6. The combination of claim 3 in which said first circuit means is an integrating network responsive to pulse signals from the deflection system for developing the sawtooth signals.

7. The combination of claim 4 in which said first circuit means and said means including a Zener diode include a direct current voltage supply for biasing said Zener diode at a level substantially equal to one-half of the Zener conduction level thereof.

References Cited

UNITED STATES PATENTS

| | | |
|---|---|---|
| 2,906,818 | 9/1959 | Goodrich. |
| 3,248,569 | 4/1966 | Weekes. |
| 3,267,214 | 8/1966 | Sullivan. |

ROBERT L. GRIFFIN, Primary Examiner

A. H. EDDLEMAN, Assistant Examiner

U.S. Cl. X.R.

178—7.3